Feb. 15, 1938.   C. S. WRAY   2,108,222
SEAT SUSPENSION FOR VEHICLES
Filed April 3, 1936
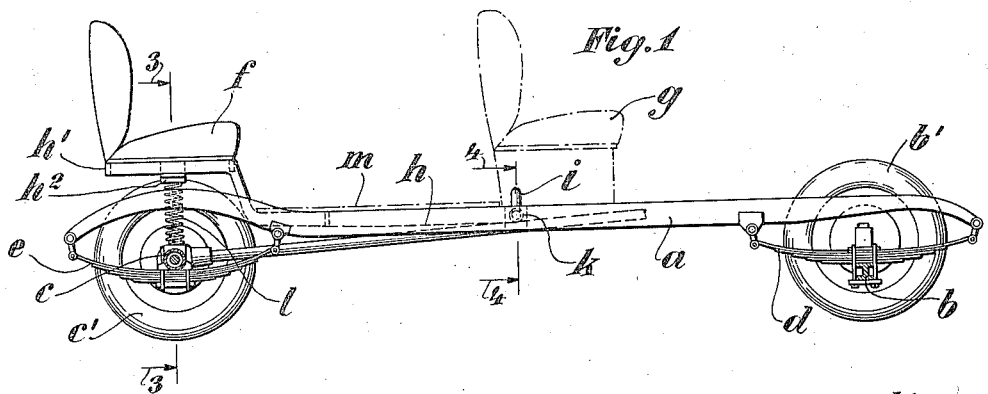
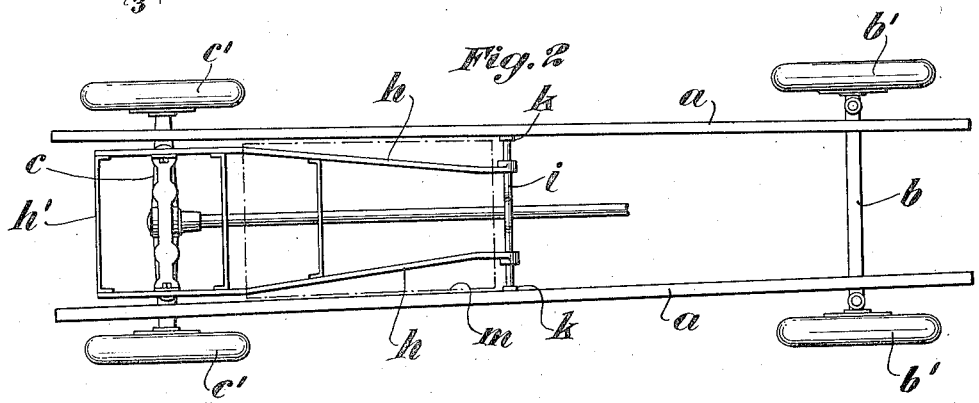
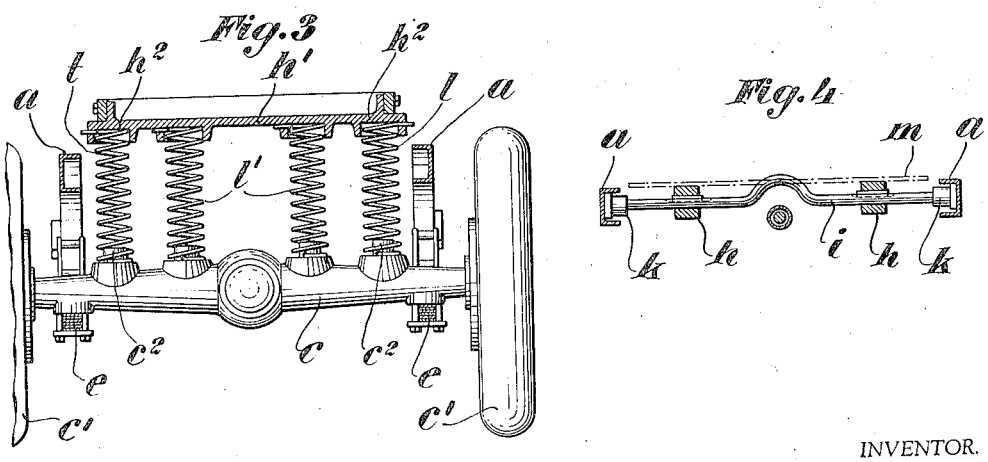
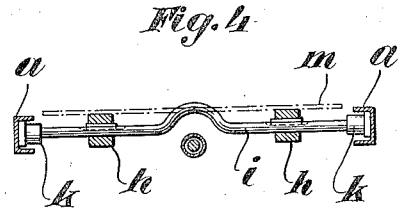
INVENTOR.
Charles S. Wray,
BY Hoguet, Neary & Campbell,
HIS ATTORNEYS Patented Feb. 15, 1938

2,108,222

UNITED STATES PATENT OFFICE 2,108,222

SEAT SUSPENSION FOR VEHICLES

Charles S. Wray, Atlantic Highlands, N. J.

Application April 3, 1936, Serial No. 72,469

3 Claims. (Cl. 280—106.5)

This invention relates to an improved suspension for one or more of the seats of a vehicle and is particularly designed with reference to incorporation in motor vehicles. More particularly, the invention is concerned with the improvement in the suspension of the rear seat of motor vehicles although it will be apparent as the description proceeds that the principles may be employed for other seats.

The principal object of the invention is to provide such a suspension as will reduce the extent of movements of the seat and the severity of the shocks impressed thereon from the road surface. A further object of the invention is to free the seat to a maximum extent of the influence of the forces of the suspension springs for the chassis of the vehicle. A further object is to associate with the improved suspension, springs of such character as will promote riding comfort and effectively dampen the movement of the seat. A further object of the invention is to support the seat on an independent sub-frame which itself is pivotally mounted on the chassis whereby the seat frame with the seat has capacity for relatively free movement with relation to the chassis. A further object is to support the said seat frame on the chassis at a point where the amplitude of movement of the chassis normally is a minimum. More specifically, in accordance with the above stated objects of the invention the seat frame is pivotally mounted on the chassis adjacent the mid-section thereof and suspended by suitable springs which are operatively interposed between the frame and one of the axles of the vehicle thereby minimizing the influence of the load carrying vehicle springs.

These and other objects and advantages will appear more particularly in connection with the description of the embodiment shown, by way of example, in the accompanying drawing, in which:

Figure 1 is a view in side elevation of a vehicle chassis on which is supported the improved seat suspension.

Figure 2 is a view in plan of the chassis shown in Figure 1.

Figure 3 is a view in vertical section through the improved seat suspension shown in Figure 1 and taken on the plane indicated by the line 3—3 of Figure 1 and looking in the direction of the arrows.

Figure 4 is a sectional view through the chassis showing the pivotal support for the improved seat suspension taken on the plane indicated by the line 4—4 of Figure 1 and looking in the direction of the arrows.

The invention is not to be limited to the type or structure of the vehicle in which it is incorporated. The drawing shows somewhat diagrammatically the principal related parts of a motor vehicle in which $a$ comprises the side frame members of the chassis, $b$ the front axle, $b'$ the front wheels, $c$ the rear axle and $c'$ the rear wheels. The chassis frame is supported on the axles by suitable springs illustrated as at $d$ for the front axle $b$ and at $e$ for the rear axle $c$, as conventional type semi-elliptical leaf springs.

The improved seat suspension is shown as provided for the rear seat $f$ which, as generally recognized, in modern automobiles, has less favorable riding qualities than the front seat $g$ by reason of its location with relation to the axles and vehicle springs. In accordance with the invention the rear seat $f$ is mounted on a sub-frame which includes longitudinally extending members $h$ formed of appropriate shape to serve the purpose. At one end of these side frame members support for the seat $f$ is afforded, the members then being dropped so as not to interfere with the legs and then extended forwardly in a substantially horizontal plane. The front ends of these side frame members may be conveniently secured to a cross shaft $i$, the ends of which are journaled rotatably in bearings $k$ carried by the side frame members $a$ of the chassis. The cross shaft $i$ is preferably located at that portion of the chassis which has the smallest amplitude of movement caused by pitching of the chassis by up and down movements of the wheels $b'$, $c'$. This portion of the chassis will ordinarily be found in the neighborhood of its mid-section, that is to say, approximately halfway between the wheels $b'$, $c'$. It will be evident, for instance, with reference to Figure 1 that when the wheels $b'$ move up or down for a given distance with relation to the rear axle $c$, the chassis members $a$ at a point halfway between the wheels will move only half of said distance, and the reverse is true when the wheels $c'$ move up and down with relation to the front axle $b$.

The sub-frame which will be designated generally for convenience as a unit $h'$ is supported yieldingly by suitable springs shown as compression springs $l$ interposed operatively between the sub-frame and the rear axle $c$. Suitable seats to hold the springs $l$ in proper relation to these respective members are indicated at $h^2$, $c^2$. Other suitable springs illustrated as tension springs $l'$ are also operatively interposed between the frame $h'$ and the axle $c$. The effective tension on the springs $l'$ is, of course, related to the characteristics of the compression springs $l$, the preferred relationship being such that for a normal load on the seat $f$ the springs $l'$ may supplement the action of the springs $l$, as compression springs under predetermined downward movement of the frame $h'$, while the tension springs $l'$ will resist upward movement of the frame $h'$ through a predetermined range of movement, in opposition to the compression springs $l$.

A suitable floor is indicated in dotted lines at $m$ in Figures 1 and 2, this flooring being carried on the horizontal portions of the sub-frame members $h$. It may be found desirable to provide flexible material along the edge of the flooring in a finished vehicle so that while it is free to move relative to the chassis and body no openings appear. Similarly, while the cross shaft $i$ will serve generally to prevent distortion of the sub-farme it may be found advisable to interpose guide members between the sub-frame and the chassis or the body so that the sub-frame will not be distorted.

From the aforegoing description it will be appreciated that the amplitude of movement of the cross shaft $i$ is kept at a minimum. The sub-frame and seat $f$ are subjected to the influence of the forces of the vehicle springs $e$ to a minimum degree. This is desirable because the springs $e$, in turn, are subject to the inertia forces of both the live load and the dead load. The springs interposed between the sub-frame and the dead axle cushion the seat $f$ against shocks caused by movement of the dead axle and the amplitude of movement of the seat $f$ is limited yieldingly by the conjoint action of the springs $l$ and $l'$. The result is greatly improved riding qualities of the seat $f$ both in respect to the amplitude of movements and the shocking forces impressed thereon.

Changes in details of form, dimensions and the character of the springs used and their points of application may be made by those skilled in the art without departing from the principles disclosed.

What I claim is:

1. In a vehicle in combination with supporting wheels, a supporting frame and supporting springs interposed operatively between the wheels and the frame, a seat sub-frame independent of said springs pivotally mounted on the said main frame and connected thereto at the pivot point only, and springs independent of the first springs operatively interposed between the sub-frame and one set of wheels to restrain pivotal movements of the said sub-frame, whereby the first springs serve to cushion movement of the supporting frame and the second springs serve as the sole cushioning means between the sub-frame and the said one set of wheels.

2. In a vehicle in combination with supporting axles and wheels, a supporting frame, supporting springs operatively interposed between the frame and the axles, a seat sub-frame independent of said springs pivotally mounted adjacent the intermediate portion of the said main frame and connected thereto at the pivot point only, and springs independent of the first springs operatively interposed between the sub-frame adjacent its other end and one of said axles for yieldingly restraining the pivotal movements of said sub-frame, whereby the first springs serve to cushion movement of the supporting frame and the second springs serve as the sole cushioning means between the sub-frame and the said one set of wheels.

3. In combination with a vehicle having supporting axles and wheels, a main frame, supporting springs interposed operatively between the axles and the main frame, a sub-frame independent of said springs pivotally supported on the main frame at substantially the mid point thereof and connected thereto at the pivot point only and having a horizontally extending portion disposed within the main frame and a seat supporting portion adjacent its free end elevated above said horizontally extending portion, and springs independent of the first springs operatively interposed between the seat supporting portion and an axle to restrain yieldingly pivotal movements of the sub-frame, whereby the first springs serve to cushion movement of the supporting frame and the second springs serve as the sole cushioning means between the sub-frame and the said one set of wheels.

CHARLES S. WRAY.